Oct. 10, 1933.    T. MAEDA    1,929,984
METER MOVEMENT
Filed Sept. 23, 1931    2 Sheets-Sheet 1

INVENTOR,
TADASHI MAEDA
BY Donald K. Lippincott
ATTORNEY.

Oct. 10, 1933.  T. MAEDA  1,929,984
METER MOVEMENT
Filed Sept. 23, 1931  2 Sheets—Sheet 2

INVENTOR,
TADASHI MAEDA
BY Donald K. Lippincott
ATTORNEY

Patented Oct. 10, 1933

1,929,984

UNITED STATES PATENT OFFICE 1,929,984

METER MOVEMENT

Tadashi Maeda, Sausalito, Calif.

Application September 23, 1931
Serial No. 564,529

11 Claims. (Cl. 171—34)

My invention relates to integrating meters, such as ampere-hour meters and volt-ampere-hour meters, and its primary purpose is to provide a meter movement or drive whose speed, over a wide range, is directly proportional to current flow.

Among the objects of my invention are: To provide an alternating current meter of the induction disk type whose speed is substantially proportional to current flow; to provide a movement suitable for driving ampere-hour meters; to provide a meter drive having a wide operating range; to provide a movement which is readily adaptable to volt-ampere or kilo-volt-ampere-hour meters; and to provide a drive which can readily be adjusted to a degree of accuracy comparable with present day watt-hour meters and which will maintain its accuracy with use.

Other objects of my invention will be apparent or will be specifically pointed out in the description forming a part of this specification, but I do not limit myself to the embodiment of my invention herein described, as various forms may be adopted within the scope of the claims.

Referring to the drawings.

Figure 1:
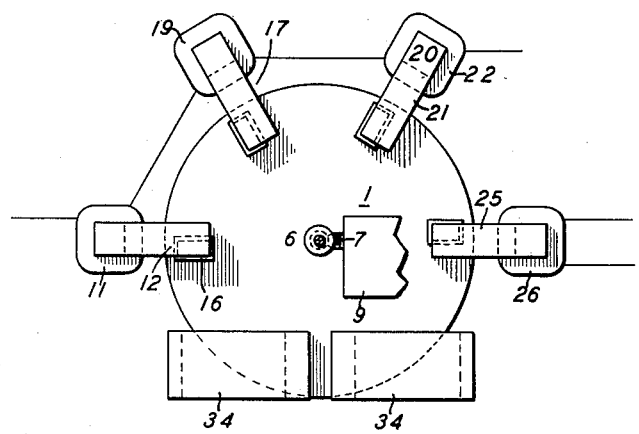
Figure 1 is a plan view of an ampere-hour meter embodying my invention, conventional portions of the meter being shown schematically.
Figure 2:
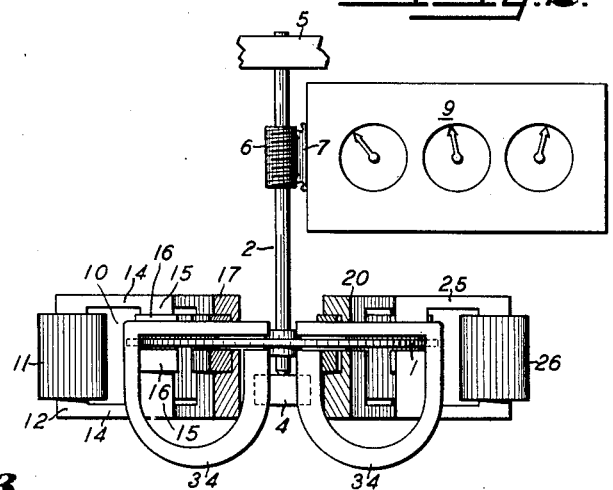
Figure 2 is a front elevation of the meter shown in Figure 1.

Although there is a wide field of usefulness for a meter whose speed is directly proportional to the current flow therein, no such meter has at this time come into general commercial use. The induction-disk meter, which is used as a drive in substantially all alternating current watt-hour meters, depends for its movement upon the interaction of two magnetic fluxes, of specified phase relation. In the watt-hour meter one of these fluxes is proportional to the voltage, and the other is proportional to current, the deviation from proper phase relationship in the fluxes being substantially proportional to the power factor, so that the meter gives a sufficiently exact reading of the actual power consumed in the circuit.

Where a meter is desired to read current only, however, each of the fluxes must be derived from the same source in order that their phase relation may remain constant, and since the speed is proportional to the product of the two fluxes, it becomes also proportional to the square of the current producing them. This means that the meter's rate, in revolutions per second per ampere, varies with the number of amperes flowing, and hence the device is useless for metering purposes unless some elaborate system of compensation be devised.

In practically all of these meters the driving magnets have been so constructed that the driving fluxes were determined by the air-gap, so that these fluxes were directly proportional to the currents flowing.

Considered broadly, my invention comprises a driving magnet whose flux is limited by the reluctance of the magnetic material composing the greater part of the flux path, rather than by the air-gap. Almost all of such materials have magnetization curves at least a portion of which follow a square root law, that is, the magnetization produced is proportional to the square root of the magnetizing force. One such material is the nickel iron alloy known as "permalloy", and from one point of view my invention comprises the use of this material as the core for the driving magnet of a meter. Several such magnets, operated at different portions of their magnetization curves, may be employed to drive the same disk, and from another point of view my invention comprises the use of a plurality of driving magnets, preferably operated in series and at different portions of their magnetization curves, and composed of different materials, to provide a total flux which varies almost exactly as the square root of the current causing the flux, the deviation from the true square root law being such as to compensate partially for the self-braking effect of the induction-disk meter movement when used at relatively high speed.

In order to describe more fully the principles of my invention, the physical arrangement of the apparatus will first be described, following which the theoretical considerations will be taken up in detail.

A simple form of my invention comprises the usual induction disk 1, preferably of aluminum, which is mounted on a shaft 2 and pivoted in a lower bearing 4 and upper bearing 5. The shaft 2 carries a worm or other suitable driving gear 6 which meshes with a worm-gear 7 for driving a counter 9, the latter being of well known form and indicated conventionally.

Spaced around the periphery of the disk are a plurality of driving magnets, each provided with an air-gap which embraces the edge of the disk. The exact form of the driving magnet is immaterial, that shown being perhaps the simplest. The magnet indicated by the general reference character 10 comprises a coil 11, preferably having a relatively large number of magnetizing turns, and a core 12 which is preferably formed of permalloy or other alloy having extremely high initial permeability, i. e., very high permeability for extremely small magnetizing forces. Although the name permalloy is usually taken to signify an alloy of approximately 72% of nickel and 28% of iron, it is to be understood that other alloys of the same series or having substantially similar magnetic characteristics do not fall outside of the scope of this invention.

The core is characterized by portions 14 whose cross-section is much less than the portions 15 which form the pole-pieces, this construction being adopted so that the reluctance of the magnetic system will be primarily determined by the portions 14 rather than by the reluctance of the air-gap, which has low reluctance due to its relatively large area, i. e., the reluctance of the core is the major reluctance in the magnetic circuit, even at magnetizations far below saturation. Approximately one-half of one or both of the pole-pieces 15 is surrounded by a short circuited turn or shading-coil 16, to provide an out-of-phase flux for producing current in the induction disk, this shading-coil construction being well known in the art.

A second driving magnet 17 is similar to the magnet 10, with which it is connected in series, except for the fact that its magnetizing coil is of fewer turns than the coil 11. The third driving magnet 20 differs from the magnets 10 and 17 in that the core 21 is formed of silicon steel or other high grade magnetic material which exhibits what may be called "normal" magnetic characteristics, i. e., it has an initial permeability much lower than permalloy and its allied alloys. The coil 22 of this magnet will usually have a number of turns intermediate between the other two coils, the ratio of turns in the present case being 30:3:20.

Each of these magnets is constructed in the manner described in detail in connection with the magnet 10, i. e., its coil, winding, and air-gap are so proportioned that it is the magnetization curve of the magnetic material and not the reluctance of the air-gap which determines its magnetic flux.

Figure 3:
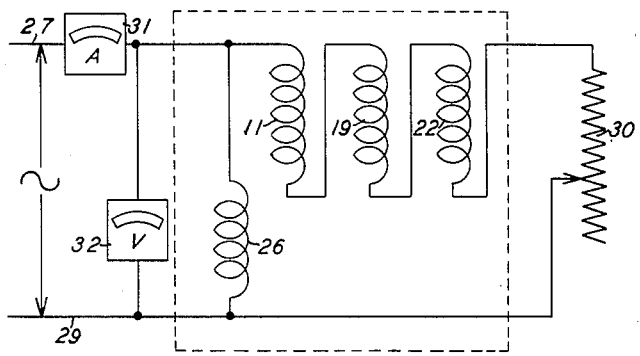
Figure 3 is a connection diagram for the meter shown in Figures 1 and 2.

A fourth magnet 25 is provided as a "no load adjustment". The coil 26 of this magnet is arranged for voltage operation, being designed for connection across the line wherein the current is to be measured, the connection of a typical test circuit utilizing the meter of my invention being shown in Figure 3, wherein the coils 11, 19, and 22, are shown connected in series with the supply lines 27 and 29 and the load or resistance 30, while the coil 26 is shown as connected in shunt. In the figure the ammeter 31 and volt meter 32 are shown properly connected, merely to indicate the factors determining the torque in the various coils.

The meter is also provided with a braking magnet or magnets 34. These are permanent magnets having air-gaps within which the disk runs, in order to generate eddy currents therein to control the speed of the disk. These eddy currents are proportional to the speed, so that if the torque of the driving magnet is proportional to current, the reverse or braking torque due to the magnet 34 being proportional to speed, the speed of the disk will be proportional to current.

With a driving magnet or magnets arranged as shown, the driving torque T is proportional to the square of the flux $\phi$ in the magnetic circuit, as long as the disk is not in motion. With the disk in motion the driving torque is the same, but there also exists a so-called self-braking torque $t$ which is proportional to the speed times the square of the flux. This can be expressed in equations as follows: $T=a\phi^2$, $t=b\omega\phi^2$, $T'=b\omega$; where $T'$ is the braking flux of the permanent magnet, $\omega$ is the angular velocity, and $a$, $b$, and $c$ are constants of proportionality. Neglecting friction, which is small, the driving torques must equal the braking torques at any speed. We may therefore put $a\phi^2=\omega b+\omega c\phi^2$, or $$\omega=\frac{a\phi^2}{b+c\phi^2}.$$

For low speeds the second term in the denominator is small and may be neglected in comparison with the first. For high speeds, where $\omega$ and $\phi^2$ both increase, it becomes the controlling factor.

Figure 6:
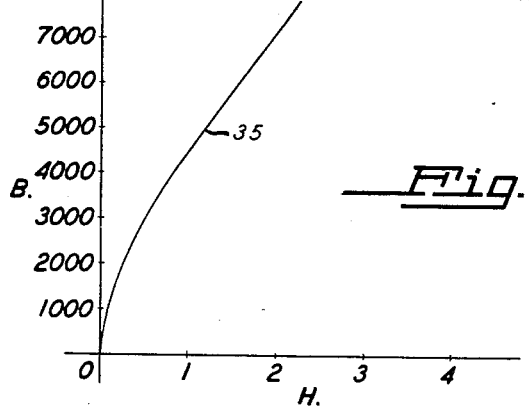
Figure 6 is an ideal curve showing the relationship between current and flux in the driving magnet of a meter having a perfectly straight-line speed-current curve.

In the ordinary type of induction-disk drive, where the flux in the driving magnet is primarily determined by the air-gap, $\phi$ is proportional to I, the current in the coil. Under these circumstances the speed of the meter is proportional to $I^2$ over a large portion of the operating range. If $\phi$ can therefore be made proportional to the square root of I, the meter speed would be proportional to current over this portion. An ideal curve 35, showing the relationship between $\phi$ and I is given in Figure 6. This is not a true square root curve, however, since it has a point of inflection between four thousand and five thousand gausses, where the self-braking torque becomes important. For the construction specified above, this curve is almost exactly approximated, as will now be shown.

Figure 5:
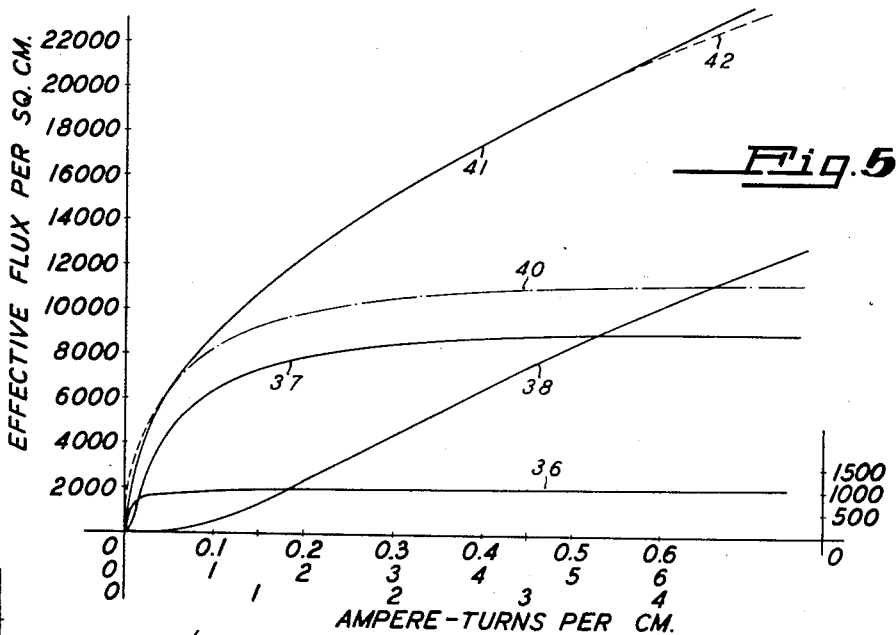
Figure 5 is a curve showing the relationship between current and flux in the various driving magnets of the meter.

In Figure 5 are shown the magnetization curve of the three series driving magnets, plotted in terms of flux in the air-gap. Curve 36 refers to the magnet 10, curve 37 to the magnet 17, and curve 38 to the magnet 20. The three scales of abscissas refer respectively to curves 38, 36, and 37, reading downward in the order given. The ordinates of curve 36 are plotted to a double scale, as indicated at the right of the curves. Adding the ordinates of curves 36 and 37 gives the curve 40, indicated in dot-and-dash lines, while the addition of curve 38 gives curve 41. The dotted curve 42 is plotted adjacent curve 41 to show the deviation of the latter from the square root curve, particularly as regards the point of inflection mentioned in connection with curve 35 of Figure 6.

Figure 4:
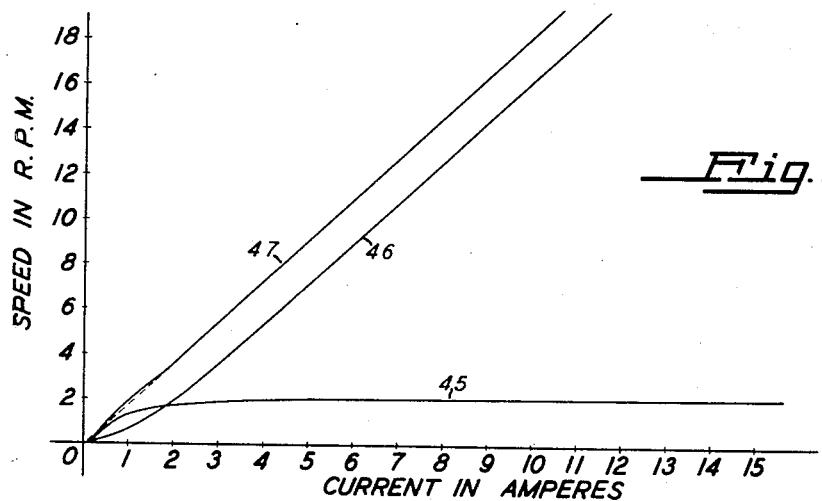
Figure 4 shows the speed-current curve obtainable with a meter utilizing two driving magnets.

Referring now to Figure 4, curve 45 shows the relation between speed and current with only the driving magnet 10 excited. Curve 46 shows the speed-current curve when only the magnet 17 is excited. When both of these two magnets are connected in series, the relation between speed and current is shown by curve 47. It will be noted that this relation is almost exactly linear, except for a slight deviation for currents of the order of one ampere. The curves given are experimental curves, and it is quite probable that with minor adjustments even this slight deviation could be obviated, but at all events its magnitude is well within the limits of accuracy prescribed for instruments of this character, i. e., integrating meters in general.

The addition of the curve of the third magnet is not shown in Figure 4, since it would only complicate the figure and the method of addition is precisely the same. The general accuracy may easily be deduced from curve 41 of Figure 5, where it will be seen that the deviation from the square root law occurs only with relatively high fluxes, and that it is in the correct direction to compensate for the self-braking effect.

It will be noted that the curves of Figure 4 do not pass through the origin. This is due to the friction of the instrument, and it is to compensate for this that the shunt driving magnet 25 is used. This magnet is so adjusted that its driving torque is just sufficient to compensate for the friction of the meter movement. Changes in voltage in a circuit of this type are small, and since the driving torque of this magnet is in itself small, such variations produce only second order effects and the compensation is nearly exact. Compensation of this type is customary in watt-hour-meter movements, and therefore the subject will not be gone into in detail here.

It will be obvious that there are a large number of variables which can be changed in constructing meters of this type. Instead of changing the number of turns on the driving magnet, the size of the restricted portion of the core can be varied. With a given size of coil and core, the distance of the air-gap from the shaft can be varied to change the torque for a given flux, etc.

The essential factors which make the design of a meter of this type possible are, first, the magnetization curves of the high permeability alloys follow a square root law over a considerable portion of their extent, this square root portion extending well above the so-called knee of the curve. Second, the deviations of these curves from the square root law occur at the toe of the curve and well above the knee, and therefore two or more of the curves may be plotted on different scales with a resultant curve following the ideal magnetization curve more closely and for a longer distance as more magnets are added. Third, the ordinary magnetic materials, such as silicon steel, although they deviate more widely from the square root law than do the high permeability alloys, deviate in such a direction as to compensate for the self-braking effect, and therefore by the combination of high permeability alloys and normal magnetic material, it is possible to construct a meter in which the rotational speed is accurately proportional to the driving current.

Although the induction disk is mentioned throughout this specification and claims, it is to be understood that this is merely because the use of a disk is convenient and common practice, and that a cylindrical, conical, or other form of rotating element could be used with full equivalence.

I claim:

1. An alternating current induction motor whose speed is substantially proportional to the driving current, comprsing an induction disk, and a magnet for driving said disk comprising an exciting coil and a permalloy core, said coil and core being so proportioned that the flux in said core is substantially proportional to the square root of the current in said coil over the desired operating range of said magnet.

2. An alternating current ampere-hour meter driving element comprising an induction disk, and a plurality of driving magnets for producing fluxes linking said disk, each of said magnets being proportioned to produce a flux substantially proportional to the square root of the current producing it and to produce said flux in a different operating range.

3. An alternating current ampere-hour meter driving element comprising an induction disk, and a plurality of driving magnets for producing fluxes linking said disk, each of said magnets comprising a winding and a core, the proportions whereof are adapted to produce different degrees of magnetization in the different magnets and the reluctance of said cores being the major reluctance in the magnetic circuit thereof.

4. An alterating current ampere-hour meter driving element comprising an induction disk, and a plurality of driving magnets for producing fluxes linking said disk, said magnets being connected in series and proportioned for different degrees of magnetization in the different magnets and the reluctance of said cores being the major reluctance in the magnetic circuit thereof.

5. An alternating current ampere-hour meter driving element comprising an induction disk, and a plurality of driving magnets for producing fluxes linking said disk, one of said magnets including a permalloy core proportioned so that the reluctance of said core is the factor determining the flux produced thereby.

6. An alternating current ampere-hour meter driving element comprising an induction disk, and a plurality of driving magnets for producing fluxes linking said disk, one of said magnets including a core of relatively high initial permeability and another of said magnets including a core of relatively low initial permeability.

7. An alternating current ampere-hour meter driving element comprising an induction disk, and a plurality of driving magnets for producing fluxes linking said disk, one of said magnets including a permalloy core, and another of said magnets including a core of relatively low initial permeability.

8. An alternating current ampere-hour meter driving element comprising an induction disk, and a plurality of driving magnets for producing fluxes linking said disk, said magnets comprising one having a readily saturable permalloy core, a second having a less readily saturable permalloy core, and a third having a core of magnetic material having a degree of initial permeability approximating that of silicon steel.

9. An alternating current ampere-hour meter driving element comprising an induction disk, and a plurality of driving magnets for producing fluxes linking said disk, the windings and cores of said magnets being so proportioned that the total flux produced thereby is substantially proportional to the square root of the current therethrough.

10. An alternating current ampere-hour meter driving element comprising a pivotally mounted induction disk, and a magnet for providing a driving flux linking said disk, said magnet comprising a core provided with an air-gap for embracing the disk, and a winding for exciting said core, the proportions of said winding, core and air-gap being such that the magnetization of the core is the factor limiting the flux through said gap for fluxes less than saturation.

11. An alternating current ampere-hour meter driving element comprising a rotatable induction disk, and magnetic driving means for said disk including magnetic core material different portions of which are excited to different degrees of magnetization, the flux in said portions being primarily determined by the magnetization thereof at values below saturation.

TADASHI MAEDA.